(12) United States Patent
Bailey et al.

(10) Patent No.: US 7,821,687 B2
(45) Date of Patent: Oct. 26, 2010

(54) METHOD FOR DYNAMICALLY COMPENSATING FOR A FAULTY PIXEL IN A SCAN LINE GENERATED BY A SCANNER

(75) Inventors: James Ray Bailey, Georgetown, KY (US); David Allen Crutchfield, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 374 days.

(21) Appl. No.: 11/867,202

(22) Filed: Oct. 4, 2007

(65) Prior Publication Data
US 2009/0091808 A1   Apr. 9, 2009

(51) Int. Cl.
*H04N 1/46* (2006.01)
*H04N 1/60* (2006.01)
*H04N 1/409* (2006.01)
*H04N 1/00* (2006.01)
*G06K 9/40* (2006.01)

(52) U.S. Cl. ........................ 358/504; 358/474; 358/1.9; 358/3.26; 358/437; 382/275

(58) Field of Classification Search ................ 358/504, 358/461, 406, 443, 446, 474, 1.9, 3.26, 437, 358/509; 348/246, 247; 382/275
See application file for complete search history.

(56) References Cited

U.S. PATENT DOCUMENTS

| 5,563,723 A * | 10/1996 | Beaulieu et al. ............ 358/461 |
| 5,748,803 A * | 5/1998 | Schielke ..................... 382/275 |
| 2008/0079826 A1 * | 4/2008 | Noh ............................ 348/246 |

* cited by examiner

*Primary Examiner*—Charlotte M Baker (57) ABSTRACT

A method for dynamically compensating for a faulty pixel in a scan line of a scanner having an image sensor with a plurality of sensor pixels includes generating digitized scan data; processing the digitized scan data to compensate for any faulty pixels of the plurality of sensor pixels to form compensated scan data; processing the compensated scan data to apply offset and gain correction to the compensated scan data to form calibrated scan data; processing the calibrated scan data to adjust the calibrated scan data to compensate for human visual perception to form final scan data; and storing the final scan data in a scanner image memory.

19 Claims, 6 Drawing Sheets

METHOD FOR DYNAMICALLY COMPENSATING FOR A FAULTY PIXEL IN A SCAN LINE GENERATED BY A SCANNER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to scanners and scanning methods, and more particularly to a method for dynamically compensating for a faulty pixel in a scan line of a scanner.

2. Description of the Related Art

An imaging system may include a scanner that is used to generate a digital representation of a document being scanned. Such a document may include any of a variety of media types, such as paper, card stock, etc., and may be regular (e.g., rectangular) or irregular in shape, and on which there is formed, for example, text, graphics or a picture, e.g., a photo, or a combination thereof. Typically, a color scanner generates three channels of data, e.g., red, green and blue (RGB), in generating a scanned image of the document.

Figure 1:
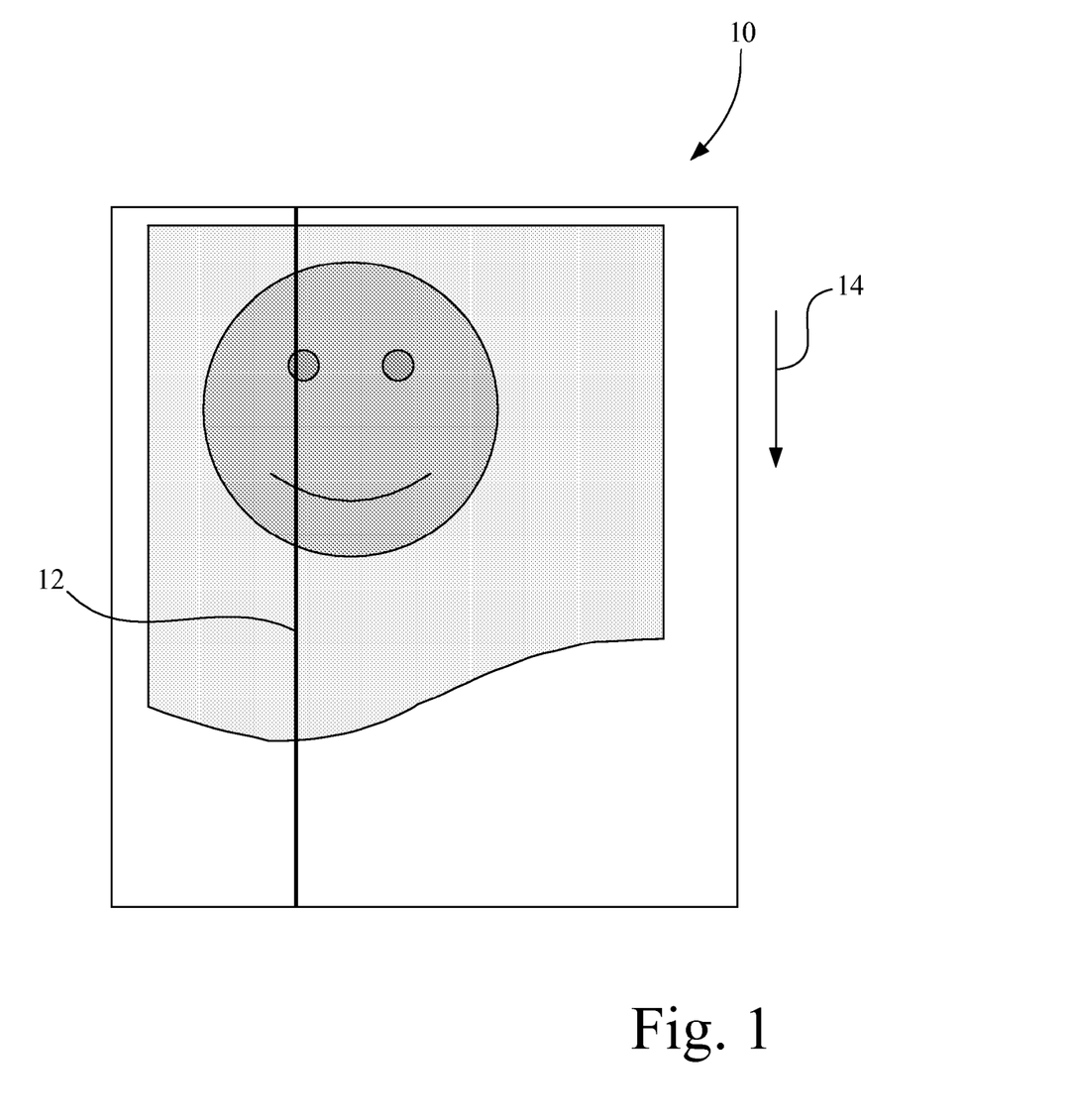
FIG. 1 is an illustration of a scanner image having an undesirable visual artifact in the form of a streak, generated by a scanner having a defective sensor element.

When scanning an image using a typical scanner, a uniform response of the image sensor across a scan line is critical to the quality of the scanned output image. Certain aspects of the scanner, such as non-uniform illumination and variable response of each individual sensor element (i.e., pixel), make it necessary to correct each individual pixel's light and dark response. This is traditionally accomplished by applying a gain factor to each pixel to stretch the true white response of the scanner to a nominal value and an offset value to set the true black response of the scanner to a nominal value. Such correction is often referred to as pixel-to-pixel calibration and is utilized to normalize the white/black response of the entire scan line. This operation assumes that each individual sensor element is operational and responds appropriately to different intensities of light. However, a very weak or dead sensor element in the scanner cannot be compensated for by traditional methods. For example, FIG. 1 illustrates a scanner image 10 having a defective streak 12 in scan direction 14 as a result of a defective pixel in the scanner. If such a defect is present on the manufacturing line, the scanner is scrapped, thus lowering the overall yield of the product and affecting cost. If such a defect occurs during the useful life of the scanner, the quality of the scanned output is greatly degraded.

One type of faulty pixel is a corrupt pixel. A corrupt pixel, e.g., a very weak or dead sensor element, in the scanner may decrease the performance of an imaging system that utilizes compression on the pixel-to-pixel calibration data, since the white/black response for the pixel is very different than that of the local neighbors of the pixel. Outlier sensor elements may drastically reduce the capabilities to compress the stored calibration data, which has a detrimental effect on the performance/throughput of a device that is bandwidth starved.

Another type of faulty pixel in a scanner is a missing pixel. For example, Contact Image Sensors (CIS) scanners are typically manufactured by stacking multiple sensor chips together in-line. If the boundaries of these chips create a dead space equal to the size of one sensor element (pixel), then the image data in this area is not captured by the scanner. This is essentially a missing pixel.

What is needed in the art is a method that automatically detects a faulty pixel and compensates for the faulty pixel to reduce or eliminate visible artifacts that otherwise would be present in the output image.

SUMMARY OF THE INVENTION

The present invention provides a method that automatically detects a faulty pixel and compensates for the faulty pixel to reduce or eliminate visible artifacts that otherwise would be present in the output image.

The invention, in one form thereof, is directed to a method for dynamically compensating for a faulty pixel in a scan line of a scanner having an image sensor with a plurality of sensor pixels. The method includes generating digitized scan data; processing the digitized scan data to compensate for any faulty pixels of the plurality of sensor pixels to form compensated scan data; processing the compensated scan data to apply offset and gain correction to the compensated scan data to form calibrated scan data; processing the calibrated scan data to adjust the calibrated scan data to compensate for human visual perception to form final scan data; and storing the final scan data in a scanner image memory.

The invention, in another form thereof, is directed to a method for initiating a scanner system including a scanner having an image sensor having a plurality of sensor pixels, a faulty pixel compensation module having access to a faulty pixel list memory, and a calibration module having access to a calibration data memory. The method includes performing a black level calibration to generate pixel-to-pixel offset data for all of the plurality of sensor pixels of the scanner; storing the pixel-to-pixel offset data in the calibration data memory; performing a faulty pixel detection to facilitate generation of a faulty pixel list; storing each pixel deemed to be a faulty pixel in the faulty pixel list stored in the faulty pixel list memory; performing a white level calibration to compute pixel-to-pixel gain data for all of the plurality of sensor pixels of the scanner; storing the pixel-to-pixel gain data in calibration data memory; compensating the offset data and the gain data for each pixel identified as being faulty; and storing the compensated offset and compensated gain data for each faulty pixel in the calibration data memory.

The invention, in another form thereof, is directed to a method for dynamically compensating for a faulty pixel in a scan line of a scanner having an image sensor with a plurality of sensor pixels. The method includes scanning an object with the scanner to generate raw scan data; processing the raw scan data to generate digitized scan data; reading a data structure that represents a faulty pixel list from a faulty pixel list memory, the faulty pixel list identifying which pixels of the plurality of sensor pixels are considered faulty; identifying a fault type of each faulty pixel; and performing a faulty pixel compensation of the digitized scan data for each faulty pixel used in generating the digitized scan data based on a respective fault type associated with a respective faulty pixel to generate compensated scan data.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components, may be utilized to implement the invention. Furthermore, and as described in subsequent paragraphs, the specific mechanical configurations illustrated in the drawings are intended to exemplify embodiments of the invention and other alternative mechanical configurations are possible.

Figure 2:
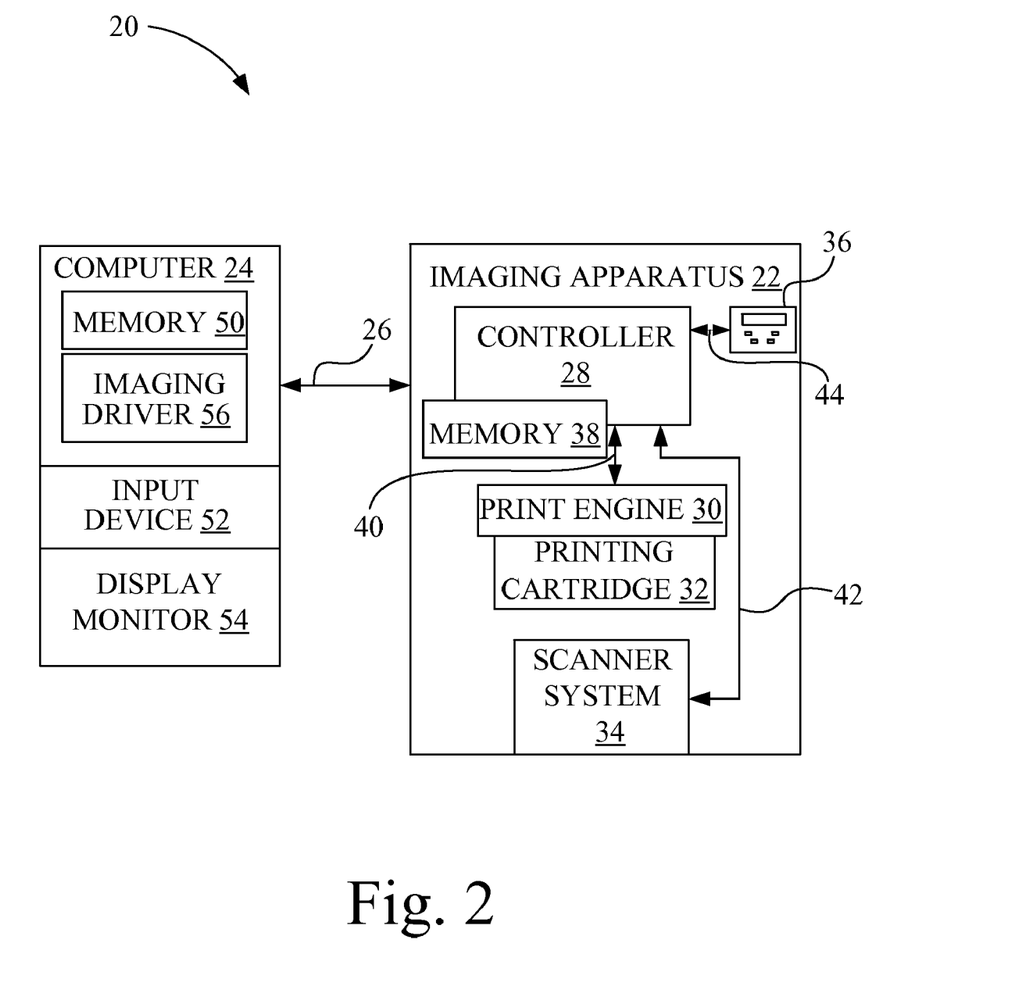
FIG. 2 is a diagrammatic depiction of an exemplary imaging system having a scanner system embodying the present invention.

Referring now to the drawings and particularly to FIG. 2, there is shown a diagrammatic depiction of an imaging system 20 embodying the present invention. As shown, imaging system 20 may include an imaging apparatus 22 and a computer 24. Imaging apparatus 22 communicates with computer 24 via a communications link 26. As used herein, the term "communications link" is used to generally refer to structure that facilitates electronic communication between multiple components, and may operate using wired or wireless technology. Imaging system 20 may be, for example, a customer imaging system, or alternatively, a development tool used in imaging apparatus design.

In the embodiment shown in FIG. 2, imaging apparatus 22 is shown as a multifunction machine that includes a controller 28, a print engine 30, a printing cartridge 32, a scanner system 34, and a user interface 36. Imaging apparatus 22 may communicate with computer 24 via a standard communication protocol, such as for example, universal serial bus (USB), Ethernet or IEEE 802.xx. A multifunction machine is also sometimes referred to in the art as an all-in-one (AIO) unit. Those skilled in the art will recognize that imaging apparatus 22 may be, for example, an ink jet printer/copier; an electrophotographic printer/copier; a thermal transfer printer/copier; other mechanism including at least scanner system 34; or a standalone scanner system 34.

Controller 28 includes a processor unit and associated memory 38, and may be formed as one or more Application Specific Integrated Circuits (ASIC). Memory 38 may be, for example, random access memory (RAM), read only memory (ROM), and/or non-volatile RAM (NVRAM). Alternatively, memory 38 may be in the form of a separate electronic memory (e.g., RAM, ROM, and/or NVRAM), a hard drive, a CD or DVD drive, or any memory device convenient for use with controller 28. Controller 28 may be, for example, a combined printer and scanner controller.

In the present embodiment, controller 28 communicates with print engine 30 via a communications link 40. Controller 28 communicates with scanner system 34 via a communications link 42. User interface 36 is communicatively coupled to controller 28 via a communications link 44. Controller 28 serves to process print data and to operate print engine 30 during printing, as well as to operate scanner system 34 and process data obtained via scanner system 34. In addition, controller 28 may operate in conjunction with scanner system 34 in accordance with the present invention to implement a method for dynamically compensating for a faulty pixel in a scan line of a scanner system 34.

Computer 24, which may be optional, may be, for example, a personal computer, including memory 50, such as RAM, ROM, and/or NVRAM, an input device 52, such as a keyboard, and a display monitor 54. Computer 24 further includes a processor, input/output (I/O) interfaces, and may include at least one mass data storage device, such as a hard drive, a CD-ROM and/or a DVD unit.

Computer 24 includes in its memory a software program including program instructions that function as an imaging driver 56, e.g., printer/scanner driver software, for imaging apparatus 22. Imaging driver 56 is in communication with controller 28 of imaging apparatus 22 via communications link 26. Imaging driver 56 facilitates communication between imaging apparatus 22 and computer 24. One aspect of imaging driver 56 may be, for example, to provide formatted print data to imaging apparatus 22, and more particularly, to print engine 30, to print an image. Another aspect of imaging driver 56 may be, for example, to facilitate collection of scanned data.

In some circumstances, it may be desirable to operate imaging apparatus 22 in a standalone mode. In the standalone mode, imaging apparatus 22 is capable of functioning without computer 24. Accordingly, all or a portion of imaging driver 56, or a similar driver, may be located in controller 28 of imaging apparatus 22 so as to accommodate printing and scanning functionality when operating in the standalone mode.

Figure 3:
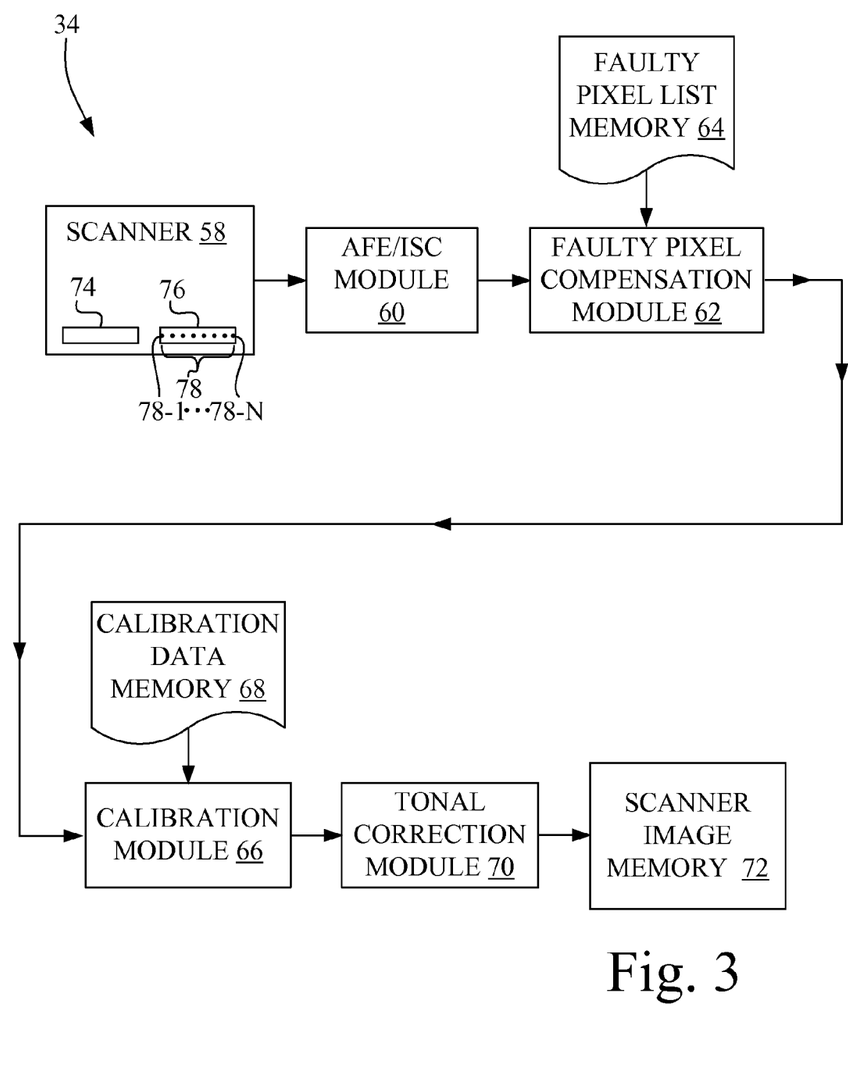
FIG. 3 is an exemplary embodiment of the scanner system of FIG. 2.

FIG. 3 shows an exemplary embodiment of scanner system 34, configured in accordance with an aspect of the present invention, which includes a scanner 58, an analog front end/image sensor control (AFE/ISC) module 60, a faulty pixel compensation module 62, a faulty pixel list memory 64, a calibration module 66, a calibration data memory 68, a tonal correction module 70 and a scanner image memory 72. Those skilled in the art will recognize that scanner system 34 may include other signal processing and/or generation circuitry not shown in FIG. 3. Modules 60, 62, 66 and 70 may be implemented, for example, in hardware, firmware or software, and may be incorporated, for example, into controller 28, imaging driver 56, or a separate device.

Scanner 58 includes a light source 74 and an image sensor 76, which for example, may be in the form of a scan bar. Scanner 58 may be of a conventional scanner type, such as for example, a sheet feed or flat bed scanner. In the context of the present invention, either scanner type may be used. As is known in the art, a sheet feed scanner transports a document to be scanned past a stationary sensor device, whereas a flatbed scanner transports a movable scan bar (i.e., sensor device) over a stationary document.

Light source 74 may be, for example, a florescent bulb, or one or more light emitting diodes (LEDs). Image sensor 76 has plurality of light sensing elements, referred to herein as sensor pixels 78, individually identified as sensor pixel 78-1 through sensor pixel 78-N, which may be formed in a linear array. Image sensor 76 may be, for example, an optical reduction module or a Contact Image Sensors (CIS) array.

The optical reduction module is a collection of tiny, light-sensitive diodes, which convert photons into electrons. These diodes are called photo sites, or photodiodes. The more photons that are captured by a single photo site, the greater the electrical charge that will accumulate at that site. The image of the document that is scanned using light source 74 reaches the optical reduction module through a series of mirrors, filters and lenses. The exact configuration of these components will depend on the model of scanner. Most optical reduction scanners use a single pass method, wherein the lens focuses the image onto three color filtered sensors. The scanner software assembles the three filtered images into a single full-color image.

In the CIS array, both light source 74 and image sensor 76 are included in the scan bar, which is typically used for example in inexpensive flatbed scanners. The CIS array includes an array of red, green and blue light emitting diodes (LEDs) and a corresponding array of phototransistors, or photodiodes. Image sensor 76, for example, may consist of hundreds or thousands (e.g., 600, 1200, 2400, 4800, etc.) of LEDs and phototransistors, or photodiodes, per inch (depending on resolution) that spans the width of the scan area, and may be placed very close to the transparent glass or plastic plate or platen upon which rests the object to be scanned. Another version of the CIS uses a single set of red, green and blue LEDS in combination with light pipes to provide illumination of the material to be scanned. When the image is scanned, the LEDs combine to provide a white light source. The illuminated image is then captured by the row of sensors. CIS scanners are cheaper, lighter and thinner, but may not provide the same level of quality, depth of field, and resolution found in most optical reduction scanners. Color scanning is done by illuminating each color type of LED separately and then combining the three scans.

Figure 4:
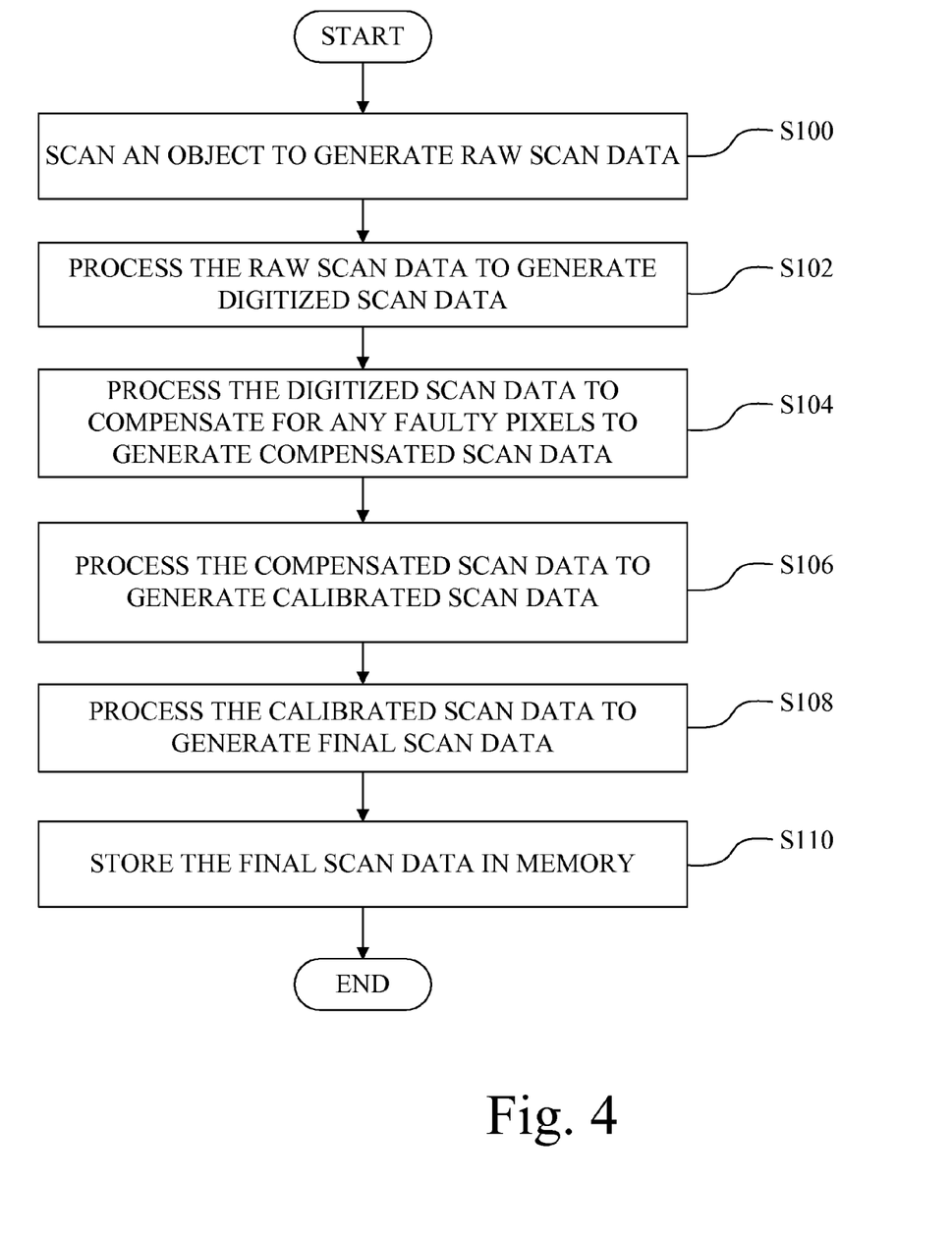
FIG. 4 is a flowchart of a method for dynamically compensating for a faulty pixel in a scan line of a scanner, in accordance with the embodiment illustrated in FIG. 3.

In scanner system 34, a signal output of each sensor pixel of image sensor 76 is read and processed, scan line by scan line, by AFE/ISC module 60, and in turn is processed by faulty pixel compensation module 62, calibration module 66, and tonal correction module 70. The operation of scanner system 34 of FIG. 3 is described below with respect to the flowchart of FIG. 4 representing a method for dynamically compensating for a faulty pixel in a scan line of a scanner, in accordance with as aspect of the present invention. The method represented by FIG. 4 may be implemented by the various components (60, 62, 64, 66, 68, 70, and 72) of the scanner system 34 of FIG. 3, which in turn may be implemented in hardware, or in firmware or software as a set of program instructions, or a combination thereof.

Referring to FIG. 4, at act S100, an object is scanned with scanner 58 to generate raw scan data. As used herein, the term "object" is intended to include any planar medium, such as a document containing one or more of text, graphics, picture and/or objects on a surface thereof, or a three dimensional object.

In general, scanner 58 provides raw scan data, e.g., 48 bit, one line at a time to AFE/ISC module 60. For optical reduction scanners, pixels are typically scanned in parallel triplets for color scans. For CIS scanners, an entire line of each color is scanned in sequentially.

At act S102, the raw scan data is processed, e.g., by AFE/ISC module 60, to generate digitized scan data. Each line of the image scanned goes through AFE/ISC module 60 to translate the data stream coming from the scanner to digitized scan data. AFE/ISC module 60 combines an analog front end function (e.g., analog-to-digital conversion) with an image sensor control that controls sensor pixels 78-1 through 78-N to sample data, and clocks the data out in a digital format, e.g., a 48 bit per pixel format, to form the digitized scan data.

At act S104, the digitized scan data is processed in accordance with an aspect of the present invention through faulty pixel compensation module 62 to compensate the digitized scan data for any faulty pixels of the sensor pixels 78-1 through 78-N, thereby forming compensated scan data. The compensated scan data may remain in the previous pixel format, e.g., 48 bit per pixel format. The details of an exemplary implementation of act S104 is more fully described below in relation to FIG. 5.

At act S106, the compensated scan data is then processed by calibration module 66 to apply offset and gain correction to the compensated scan data, thereby forming calibrated scan data. For example, calibration module 66 performs pixel-to-pixel calibration (offset/gain correction) of the compensated scan data, where the respective pre-calculated and stored calibration offset and gain data is retrieved from calibration data memory 68 to modify each respective pixel of the compensated scan data to generate the calibrated scan data. The calibrated scan data may remain in the previous pixel format, e.g., 48 bit per pixel format.

At act S108, the calibrated scan data is then processed through the tonal correction module 70 to adjust the calibrated scan data to compensate for human visual perception, thereby forming final scan data, which may be represented, for example, in a 24-bit per pixel format.

At act S110, the final scan data from tonal correction module 70 is in turn stored in scanner image memory 72. The stored final scan data may be retrieved from scanner image memory 72 for generation of a visual image perceptible to a human, such as for example, by generating a display on a monitor, such as display monitor 54 or user interface 36, or by generating a printed output using print engine 30.

In accordance with an aspect of the present invention, faulty pixel compensation module 62 performs the method by which one or more faulty pixels of sensor pixels 78 is detected and is compensated. By placing faulty pixel compensation module 62 upstream (with regard to data flow) from calibration module 66 which performs pixel-to-pixel calibration, the calibration data may be better optimized for compression, thus preventing faulty pixels from having a negative impact on calibration performance. As shown in FIG. 3, the faulty pixel compensation module 62 is placed in-line with other scanner operations, which avoids added memory bandwidth requirements.

Alternatively, it is contemplated that in the pipeline approach described above, calibration module 66 may be positioned upstream of compensation module 62, wherein offset and gain correction is applied to the digitized scan data prior to faulty pixel compensation being performed by compensation module 62.

Figure 5:
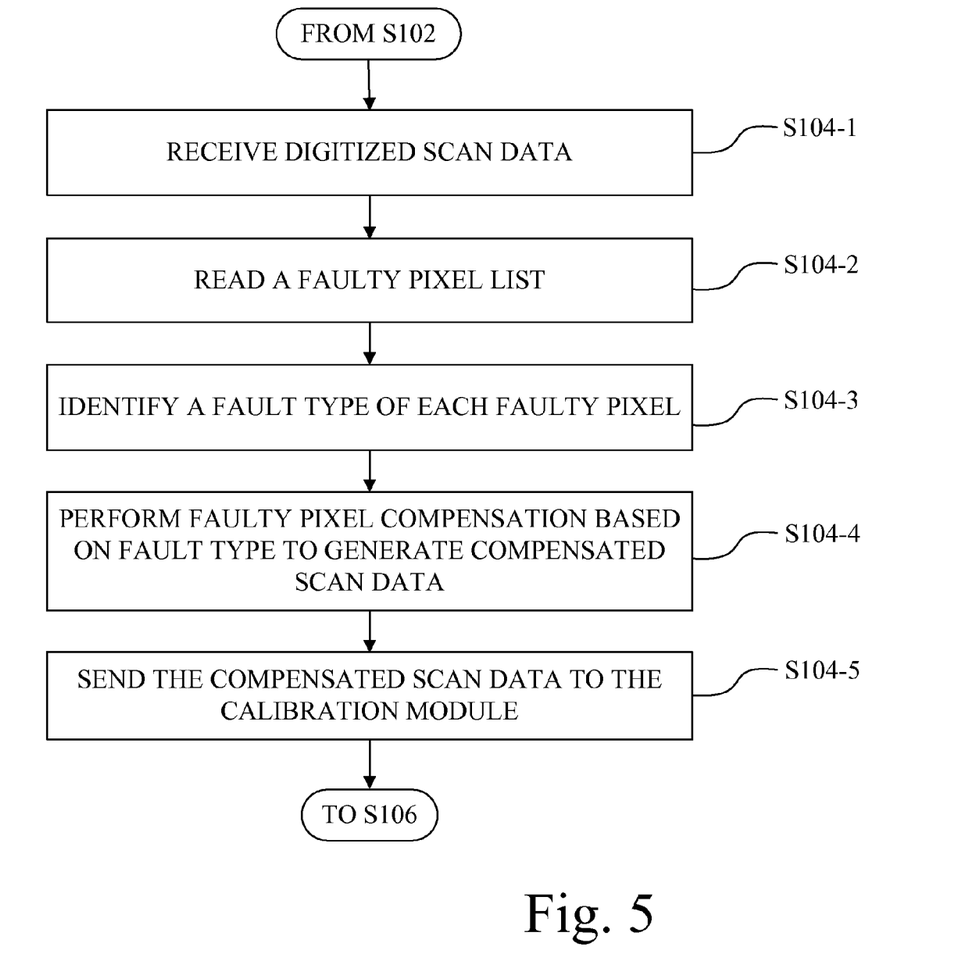
FIG. 5 is a more detailed flowchart of act S104 of the method of FIG. 4, for compensating for faulty pixels; and, FIG. 6 is a flowchart of an exemplary method for initiating the scanner system of the imaging system of FIG. 2.

FIG. 5 is a flowchart of a method for implementing act S104 using faulty pixel compensation module 62, which may be implemented in hardware, or in firmware or software as a set of program instructions.

At act S104-1, faulty pixel compensation module 62 receives digitized scan data from AFE/ISC module 60.

At act S104-2, faulty pixel compensation module 62 reads a data structure that represents a predetermined faulty pixel list from faulty pixel list memory 64. The faulty pixel list identifies which pixels of sensor pixels 78 that are considered faulty. Typically, the same faulty pixel list will be re-used for each scan line of the image data representing the object scanned by scanner 58. The faulty pixel list also includes an identification of the fault type for each faulty pixel, which may include a designation of a common fault type for a group of faulty pixels.

At act S104-3, the fault type of each faulty pixel is identified from the faulty pixel list. For example, the faulty pixel may be the result of a missing sensor pixel, e.g., a pixel that is physically absent from sensor pixels 78. Another type of faulty pixel may be a corrupt pixel, wherein at a given pixel given location, the value of the pixel is determined to be outside acceptable tolerances, e.g., a very low value. These faults are different, and thus warrant different responses from the compensation logic of faulty pixel compensation module 62. Another example of a fault type results from an electrical anomaly at one of the chip boundaries that make up image sensor 76, which exists only for a single pixel of the sensor pixels 78 of image sensor 76.

Once the type of faulty pixel is identified, at act S104-4, the fault type is used to select the desired type of faulty pixel compensation.

At act S104-4, faulty pixel compensation module 62 performs the faulty pixel compensation of the digitized scan data for each faulty pixel used in generating the digitized scan data based on a respective fault type associated with each respective faulty pixel to generate compensated scan data. For example, if a sensor pixel is missing at a given location, pixel data representing the missing sensor pixel is generated and inserted into the scan line data stream. However, if a pixel is corrupt at a given location, the original value of the digitized scan data is replaced by a compensated value.

Faulty pixel compensation module 62 may utilize, for example, mathematical interpolation (e.g. linear interpolation) to insert/replace the contents of the faulty pixel with an estimated value based on the pixel neighbors (i.e., pixels adjacent to the faulty pixel). Other methods of compensation that may be utilized include, for example, pixel mapping, pixel removal, cubic interpolation, and multi-dimensional interpolation.

At act S104-5, the compensated scan data is sent to calibration module 66, wherein the compensated scan data is converted to calibrated scan data for each pixel of the plurality of sensor pixels 78 based on respective offset data and gain data associated with each respective sensor pixel of sensor pixels 78.

Thus, in accordance with an aspect of the present invention, faulty pixels which have been compensated for will have no negative impact on pixel-to-pixel calibration performed by calibration module 66. Also, the final scan data generated by tonal correction module 70 stored in scanner image memory 72 do not include the faulty pixel(s), and thus the resulting output image generated from the final scan data will not contain visual artifacts that would have resulted from the faulty pixel(s).

Figure 6:
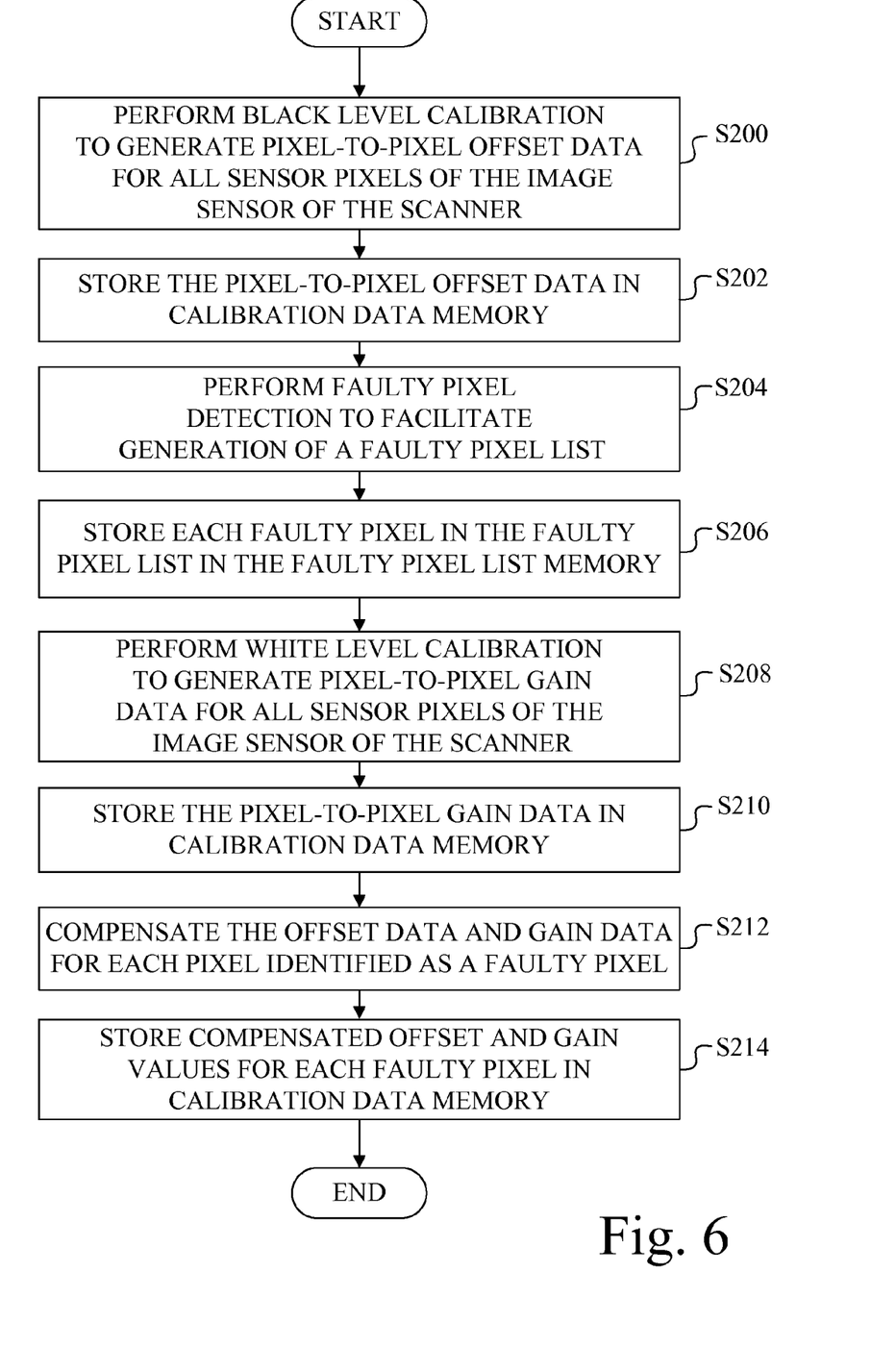

FIG. 6 is a flowchart of an exemplary method for initiating a scanner system, such as scanner system 34. During initialization a faulty pixel list is generated and stored in faulty pixel list memory 64 and compensated calibration data values are generated and stored in calibration data memory 68, in accordance with an aspect of the present invention. In other words, this aspect of the invention is used to detect faulty sensor pixels (elements) in image sensor 76, and prepare for their compensation. In one embodiment, for example, faulty pixel detection occurs dynamically during every scanner calibration, which happens frequently. In other words, while the calibration data is stored in calibration data memory 68, faulty pixel data is also being detected using the same scan data used to calibrate the offset and gain of each pixel of the sensor pixels 78.

In FIG. 6, at act S200, a black level calibration is performed to generate pixel-to-pixel offset data for all of the sensor pixels 78 of scanner 58. Act S200 may be performed, for example, by generating a scan line (or lines) of black data, e.g., with light source 74 turned OFF, or by scanning a black strip with light source 74 turned ON. Pixel-to-pixel offset data for each sensor pixel of sensor pixels 78 is then generated based on the black data.

At act S202, the pixel-to-pixel offset data is stored in calibration data memory 68.

At act S204, faulty pixel detection is performed to facilitate generation of a faulty pixel list. At act S204, white level data is generated for all of the sensor pixels 78 of scanner 58. This aspect of act S204 may be performed, for example, by generating a scan line (or lines) of white data, e.g., with light source 74 turned ON. For each pixel of the sensor pixels 78, the respective white value and black value are compared to find their difference. The difference is then compared to a predetermined threshold. The comparison determines whether or not the pixel will be assigned to the faulty pixel list.

For example, for each pixel, the difference between the value scanned for white data and the value scanned for black data is compared against the threshold. If that difference is not greater than the threshold, the pixel is not responding properly to extreme input levels, and thus is deemed faulty.

At act S206, each pixel deemed to be a faulty pixel is stored in the faulty pixel list stored in faulty pixel list memory 64, along with the respective fault type.

At act S208, white level calibration is performed to compute pixel-to-pixel gain data for all of the sensor pixels 78 of scanner 58. The white level calibration may be performed using the white data generated at act S204. Pixel-to-pixel gain data for each sensor pixel of sensor pixels 78 is then generated based on the white data.

At act S210, the pixel-to-pixel gain data is stored in calibration data memory 68.

At act S212, the process compensates the offset data and gain data for each pixel identified as being a faulty pixel. In other words offset data and gain data computed in acts S200 and S208 are then appropriately compensated for each faulty pixel identified. This compensation will often match the same compensation technique used on the actual scanned pixel (e.g., linear interpolation, pixel mapping).

At act S214, the compensated offset and gain data values for each faulty pixel are stored in calibration data memory 68. For example, the originally determined offset and gain data values for a given pixel may be overwritten in calibration data memory 68 with the appropriate compensated offset and gain data values if the given pixel is a faulty pixel.

Additional types of faulty pixel detection may be utilized in addition to the method described above with respect to FIG. 6. For example, if a pixel's response to white and black is greater than the threshold but drastically different than its local neighbors, the pixel may be deemed to be a faulty pixel.

It is contemplated that, if desired, the order of acts S204, S206 and acts S208, S210 may be reversed.

Thus, the invention described herein allows for automatic detection of faulty pixels during scanner calibration, and allows for compensation for those pixels during the actual scan operation. Since faulty pixel detection occurs during calibration, it happens frequently throughout the life of imaging apparatus 22 making scanning system 34 more fault tolerant, thus extending the life and reliability of imaging apparatus 22. The faulty pixel compensation reduces or eliminates visible artifacts resulting from individual faulty pixels. The invention may be used, for example, during a normal scanning operation of imaging apparatus 22 to improve scan quality, and to extend the useful life of scanner 58. Also, the invention may be used, for example, to increase the manufacturing yield of image sensor 76 of scanner 58, as it prevents a low number of faulty pixels from causing visible artifacts in the scanned output.

The foregoing description of a method and an embodiment of the invention have been presented for purposes of illustration. It is not intended to be exhaustive or to limit the invention to the precise steps, acts and/or forms disclosed, and obviously many modifications and variations are possible in light of the above teaching. It is intended that the scope of the invention be defined by the claims appended hereto.

What is claimed is:

1. A method for dynamically compensating for a faulty pixel in a scan line of a scanner having an image sensor with a plurality of sensor pixels, comprising:
   generating digitized scan data;
   processing said digitized scan data to compensate for any faulty pixels of said plurality of sensor pixels to form compensated scan data;
   processing said compensated scan data to apply offset and gain correction to said compensated scan data to form calibrated scan data;
   processing said calibrated scan data to adjust said calibrated scan data to compensate for human visual perception to form final scan data; and
   storing said final scan data in a scanner image memory,
   wherein said processing said digitized scan data to compensate for any faulty pixels of said plurality of sensor pixels includes:
   receiving said digitized scan data;
   reading a data structure that represents a faulty pixel list from a faulty pixel list memory;
   identifying a fault type of each faulty pixel;
   performing a faulty pixel compensation of said digitized scan data for each faulty pixel used in generating said digitized scan data based on a respective fault type associated with a respective faulty pixel, to generate said compensated scan data; and
   sending said compensated scan data to a calibration module.

2. The method of claim 1, wherein the act of performing said faulty pixel compensation is implemented by one of a mathematical interpolation, a pixel mapping, a pixel removal, a cubic interpolation, and a multi-dimensional interpolation for determining contents of said faulty pixel based on pixel neighbors of said faulty pixel.

3. The method of claim 1, wherein said faulty pixel list identifies which pixels of said plurality of sensor pixels are considered faulty.

4. The method of claim 1, wherein said faulty pixel list is re-used for each scan line scanned by said scanner.

5. The method of claim 1, wherein faulty pixel list is generated by the acts of:
   determining a difference between a respective white value and a respective black value for each pixel of said plurality of sensor pixels; and
   for each pixel of said plurality of pixels, comparing said difference to a threshold to determine whether or not said pixel will be assigned to said faulty pixel list.

6. The method of claim 1, wherein if said fault type is a missing pixel, then said faulty pixel compensation includes generating pixel data representing said missing pixel and inserting said pixel data into a data stream of said scan line.

7. The method of claim 1, wherein if said fault type is a corrupt pixel, than an original value of said corrupt pixel is replaced by a compensated value.

8. The method of claim 1, wherein said compensated scan data is converted to calibrated scan data for each pixel of said plurality of sensor pixels based on respective offset data and gain data associated with a respective sensor pixel of said plurality of sensor pixels.

9. The method of claim 8, further comprising compensating said offset data and said gain data for each pixel identified as being a faulty pixel.

10. A method for initiating a scanner system including a scanner having an image sensor having a plurality of sensor pixels, a faulty pixel compensation module having access to a faulty pixel list memory, and a calibration module having access to a calibration data memory, comprising:
    performing a black level calibration to generate pixel-to-pixel offset data for all of said plurality of sensor pixels of said scanner;
    storing said pixel-to-pixel offset data in said calibration data memory;
    performing a faulty pixel detection to facilitate generation of a faulty pixel list;
    storing each pixel deemed to be a faulty pixel in said faulty pixel list stored in said faulty pixel list memory;
    performing a white level calibration to compute pixel-to-pixel gain data for all of said plurality of sensor pixels of said scanner;
    storing said pixel-to-pixel gain data in calibration data memory;
    compensating said offset data and said gain data for each pixel identified as being faulty; and
    storing the compensated offset and compensated gain data for each faulty pixel in said calibration data memory.

11. The method of claim 10, wherein said performing a white level calibration includes generating a scan line of white data with a light source of said scanner turned ON.

12. The method of claim 10, wherein said performing a black level calibration includes one of generating a scan line of black data with a light source of said scanner turned OFF and scanning a black strip with said light source turned ON.

13. The method of claim 10, wherein said performing said faulty pixel detection includes:
    generating a scan line of white data for all of said plurality of sensor pixels of said scanner;

determining a difference between a respective white value and a respective black value for each pixel of said plurality of sensor pixels; and comparing said difference to a threshold to determine whether or not a respective pixel is faulty.

14. A method for dynamically compensating for a faulty pixel in a scan line of a scanner having an image sensor with a plurality of sensor pixels, comprising:

scanning an object with said scanner to generate raw scan data;

processing said raw scan data to generate digitized scan data;

reading a data structure that represents a faulty pixel list from a faulty pixel list memory, said faulty pixel list identifying which pixels of said plurality of sensor pixels are considered faulty;

identifying a fault type of each faulty pixel; and performing a faulty pixel compensation for each faulty pixel used in generating said digitized scan data based on a respective fault type associated with a respective faulty pixel to generate compensated scan data.

15. The method of claim 14, further comprising generating calibrated scan data by applying offset and gain correction to one of said digitized scan data prior to said faulty pixel compensation and said compensated scan data after faulty pixel compensation.

16. The method of claim 14, wherein said faulty pixel list is generated by the acts of:

determining a difference between a respective white value and a respective black value for each respective pixel of said plurality of sensor pixels; and comparing said difference to a threshold to determine whether or not said respective pixel will be assigned to said faulty pixel list.

17. The method of claim 14, wherein if said fault type is a missing pixel, then said faulty pixel compensation includes generating pixel data representing said missing pixel and inserting said pixel data into a data stream of said scan line.

18. The method of claim 14, wherein if said fault type is a corrupt pixel, than an original value of said corrupt pixel is replaced by a compensated value.

19. The method of claim 14, wherein the act of performing said faulty pixel compensation is implemented by one of a mathematical interpolation, a pixel mapping, a pixel removal, a cubic interpolation, and a multi-dimensional interpolation for determining contents of said faulty pixel based on pixel neighbors of said faulty pixel.

* * * * *